(12) United States Patent
Hortlund et al.

(10) Patent No.: US 11,189,400 B2
(45) Date of Patent: Nov. 30, 2021

(54) SHATTER PROTECTION

(71) Applicant: Hitachi Energy Switzerland AG, Baden (CH)

(72) Inventors: Stefan Hortlund, Piteå (SE); Magnus U. Henriksson, Luleå (SE); Anders Holmberg, Öjebyn (SE); Andre Johansson, Öjebyn (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 15/734,369

(22) PCT Filed: Jun. 5, 2019

(86) PCT No.: PCT/EP2019/064607
§ 371 (c)(1),
(2) Date: Dec. 2, 2020

(87) PCT Pub. No.: WO2019/234081
PCT Pub. Date: Dec. 12, 2019

(65) Prior Publication Data
US 2021/0166843 A1 Jun. 3, 2021

(30) Foreign Application Priority Data
Jun. 5, 2018 (EP) ..................................... 18175911

(51) Int. Cl.
*H01B 17/56* (2006.01)
*H01B 17/42* (2006.01)
*H01T 4/04* (2006.01)

(52) U.S. Cl.
CPC ............. *H01B 17/56* (2013.01); *H01B 17/42* (2013.01); *H01T 4/04* (2013.01)

(58) Field of Classification Search
CPC ............ H01B 17/56; H01B 17/42; H01T 4/04
See application file for complete search history.

(56) References Cited

U.S. PATENT DOCUMENTS

| 4,845,307 A | * | 7/1989 | Cumming | ............... | H01B 17/26 174/5 R |
| 6,005,196 A | * | 12/1999 | Spillyards | .............. | H01B 17/00 174/138 F |

(Continued)

FOREIGN PATENT DOCUMENTS

| CN | 101326595 A | 12/2008 |
| CN | 101346778 A | 1/2009 |

(Continued)

OTHER PUBLICATIONS

International Search Report and Written Opinion of the International Searching Authority, PCT/EP2019/064607, dated Aug. 6, 2019, 14 pages.

(Continued)

*Primary Examiner* — Pete T Lee
(74) *Attorney, Agent, or Firm* — Sage Patent Group

(57) ABSTRACT

Shatter protection for a high voltage apparatus with a ceramic insulator includes at least one electrically insulating tube including a plurality of holes going through an envelope surface. The electrically insulating tube has a diameter such that there is a minimum distance between the tube and the ceramic insulator when arranged concentrically. A method for producing a shatter protection includes winding a first helix shape of the electrically insulating fiber composite material at a first pitch such that there is a first gap between the winding turns, and winding a second helix shape of the electrically insulating fiber composite material onto the first helix shape in the opposite direction and at a second pitch, such that there is a second gap between the winding turns. Thereby forming a first electrically insulating tube with holes formed by the first and second gap between the winding turns.

15 Claims, 6 Drawing Sheets

(56) References Cited

U.S. PATENT DOCUMENTS

| | | | | |
|---|---|---|---|---|
| 6,303,870 | B1* | 10/2001 | Nazaryan | H01B 17/00 174/155 |
| 8,049,108 | B2 | 11/2011 | Hartings et al. | |
| 2015/0031798 | A1* | 1/2015 | Rocks | H01B 3/302 523/435 |
| 2016/0351305 | A1* | 12/2016 | Hiller | H01B 17/00 |

FOREIGN PATENT DOCUMENTS

| | | |
|---|---|---|
| CN | 201838439 U | 5/2011 |
| CN | 203839149 U | 9/2014 |
| CN | 205354777 U | 6/2016 |
| DE | 214022 A1 | 9/1984 |
| EP | 0229464 A1 | 7/1987 |
| EP | 2182527 A | 5/2010 |
| FR | 1370302 A | 8/1964 |
| JP | 3408893 B2 | 5/2003 |
| JP | 2012033293 A | 2/2012 |
| WO | 2009089429 A1 | 7/2009 |

OTHER PUBLICATIONS

Extended European Search Report dated Dec. 10, 2018 for European Patent Application No. 18175911.9, 8 pages.

Chinese First Office Action dated Feb. 26, 2021 for Chinese Patent Application No. 2019800357363, 9 pages (including English translation).

Indian Examination Report dated Jul. 26, 2021 for Indian Patent Application No. 202047052305, 5 pages.

Japanese Notice of Grant dated Sep. 14, 2021 for Japanese Patent Application No. 2020-567892, 5 pages (including English translation).

* cited by examiner

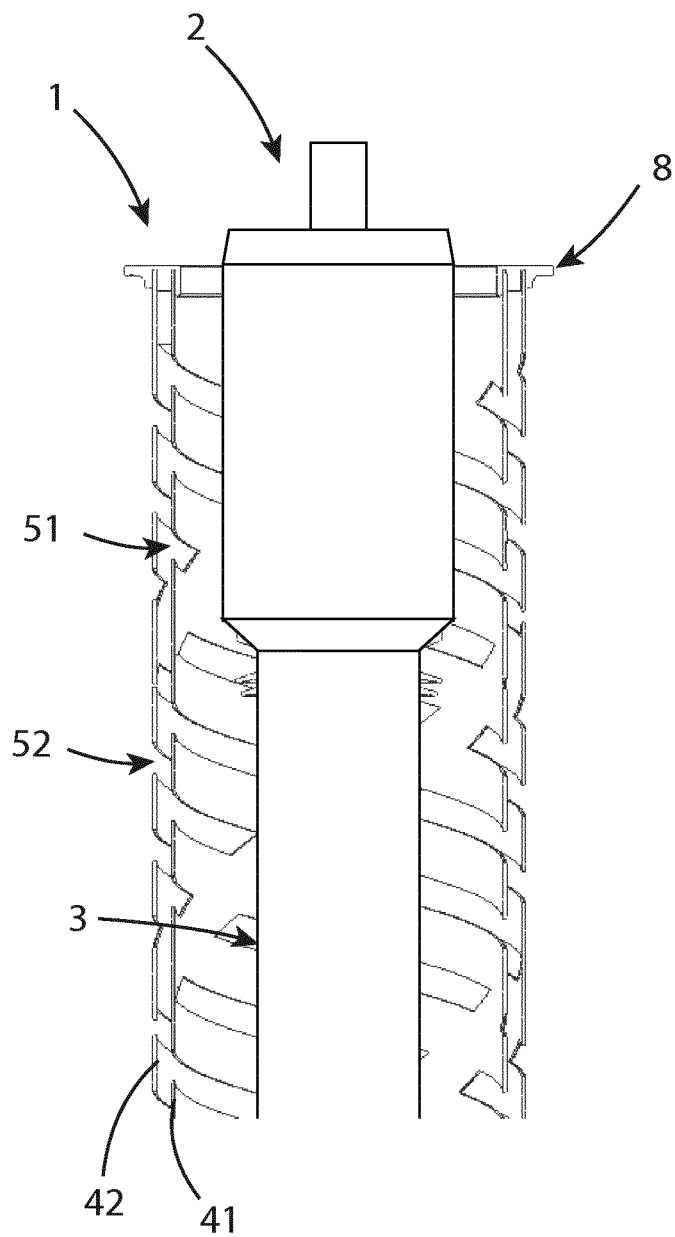
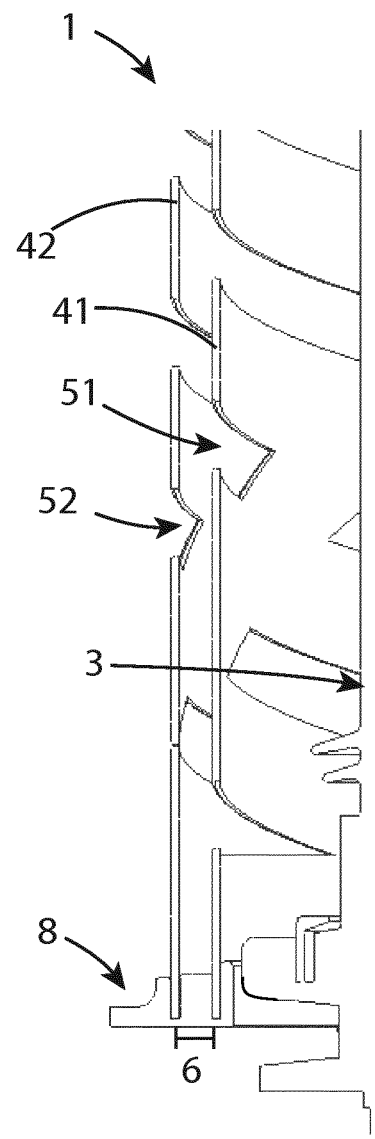
Fig. 4a                                    Fig. 4b

S5
arranging the first electrically insulating tube and the second electrically insulating tube concentrically

S5a
arranging the tubes such that the shatter protection is closed seen from a centreline and radially outwards

S5b
rotationally offsetting the electrically insulating tubes around the centerline such that the holes do not overlap and the shatter protection is closed seen from a centreline and radially outwards

Fig. 6b

SHATTER PROTECTION

CROSS REFERENCE TO RELATED APPLICATIONS

This application is a 35 U.S.C. § 371 national stage application of PCT International Application No. PCT/EP2019/064607 filed on Jun. 5, 2019, which in turns claims foreign priority to European Patent Application No. 18175911.9, filed on Jun. 5, 2018, the disclosures and content of which are incorporated by reference herein in their entirety.

TECHNICAL FIELD

The present disclosure relates to a shatter protection for a high voltage apparatus with a ceramic insulator.

BACKGROUND

Although there is an increased use of composite insulators, there are still a very large number of porcelain insulators in use. Faults in HV apparatuses with porcelain insulators often results in explosion and porcelain fragments flying at high speed in all directions; which pose a danger for personnel and neighboring equipment. Explosive failures of this type can be due to internal failures that cause sudden heating and expansion of the internal insulation medium (gas or liquid). Explosive failures can also be due to vandalism.

Present risk mitigations include:
Prevent personnel from accessing stations with energized equipment at risk.
Replace equipment at risk with new and safer equipment, e.g. dry HV apparatuses instead of oil filled HV apparatuses or use of composite insulators instead of porcelain insulators.

Japanese patent JP3408893 B2 proposes a solution to the problem when a lightning arrester insulator is damaged. Upon a lightning strike, the internal pressure inside the insulation cylinder may rise abruptly. For this reason, the insulation tube ruptures, the insulation overcoat body is damaged, and there is a possibility that the lightning protection element or the like scatters to the surroundings. In the document, a cylinder of fiber bundle impregnated with resin is shown. The cylinder has two layers of which the outer layer has holes in it. The holes are machined and formed in the outer layer. When there is an internal pressure due to the insulator breaking, the inner layer will break at the holes of the outer layer to release the pressure.

A problem with the solution is that the solution is part of the original product design and manufacture and cannot be used for retrofitting or post assembly.

SUMMARY

It is an aim of the present disclosure to at least partly overcome the above problems, and to provide an improved shatter protection for a high voltage apparatus with a ceramic insulator.

The present disclosure aims to provide a shatter protection for a high voltage apparatus with a ceramic insulator which can be used for retrofitting on existing equipment, is easy to manufacture, is easy to install and handle.

These aims are achieved by the device as defined in claim 1 and the method defined in claim 11.

According to an embodiment of the disclosure, it comprises a shatter protection for a high voltage apparatus with a ceramic insulator. The shatter protection comprises at least one electrically insulating tube, the electrically insulating tube comprising a plurality of holes going through an envelope surface of the electrically insulating tube. The electrically insulating tube has a diameter such that there is a minimum distance between the electrically insulating tube and the ceramic insulator when the shatter protection and the ceramic insulator are arranged concentrically. An electrically insulating tube with a specific diameter with holes going through the envelop surface is easily manufactured. The holes through the envelope surface will release the pressure from an explosion in the high voltage apparatus and the electrically insulating tube will catch fragments flying from the ceramic insulator.

According to some aspects, the shatter protection comprises at least two electrically insulating tubes with different diameters and which are arranged concentrically with a distance between them. Two tubes with a distance between them will increase the safety of the shatter protection. If any pieces of the ceramic insulator pass the first electrically insulating tube, the second can catch them. There is also a free path for gas or liquid to flow through the two tubes to release pressure.

According to some aspects, the holes of the at least two electrically insulating tubes are arranged such the shatter protection is closed seen from a centerline of the concentrically arranged electrically insulating tubes and radially outwards. In other words, the holes are mismatched between the at least two electrically insulating tubes. Thus, the holes are not aligned between the at least two tubes such that the holes are non-corresponding and not overlapping seen from the center axis and radially outward of the enclosed ceramic insulator.

According to some aspects, the holes through the envelope surface are arranged and shaped to increase the creepage distance between the ends of the electrically insulating tube. In the area of high voltage equipment and insulators, there is a high focus on the creepage distance. A short distance in an insulating material can lead to high leakage currents and electric discharges resulting in flashover or premature aging. The risk of high leakage currents can be decreased by increasing the creepage distance. To arrange the location and shape of the holes to increase the creepage distance between the ends of the electrically insulating tube means that the shortest distance on the envelope surface between the ends is increased by holes.

According to some aspects, the at least one electrically insulating tube comprises an electrically insulating fiber composite material. Fiber composite materials are lightweight and easy to handle during manufacturing.

According to some aspects, the at least one electrically insulating tube comprises a first electrically insulating tube comprising two layers of helically wound electrically insulating fiber composite material, wherein one of the layers comprises a first helix shape of the electrically insulating fiber composite material wound at a first pitch such that there is a first gap between the winding turns, and the other layer comprises a second helix shape of the electrically insulating fiber composite material wound onto the first helix shape, the winding of the second helix shape is in the opposite direction as the winding of the first helix shape and it is wound at a second pitch, which is different from the first pitch, and such that there is a second gap between the winding turns. In other words, the holes are shaped as rhomboids. The rhomboid shapes of the holes will give a long creepage distance since they make sure that the leakage currents cannot flow straight over the electrically insulating tube. Helically wound electrically insulating fiber composite material gives a strong and lightweight electrically insulating tube which is non-brittle.

According to some aspects, the at least one electrically insulating tube comprises a second electrically insulating tube with a different diameter than the first electrically insulating tube, the first and the second electrically insulating tubes are arranged concentrically with a minimum distance between them, wherein the a second electrically insulating tube comprises two layers of helically wound electrically insulating fiber composite material, wherein one of the layers comprises a third helix shape of the electrically insulating fiber composite material wound at a third pitch such that there is a third gap between the winding turns, and the other layer comprises a fourth helix shape of the electrically insulating fiber composite material wound onto the third helix shape, the winding of the fourth helix shape is in the opposite direction as the winding of the third helix shape and it is wound at a fourth pitch, which is different from the third pitch, and such that there is a fourth gap between the winding turns. The second electrically insulating tube has the same advantages as the first arranged in the same way.

According to some aspects, the electrically insulating fiber composite material comprises an inorganic fiber reinforced polymer material. The inorganic fiber being for example glass fiber or basalt fiber. The polymer being for example vinylester, epoxy or silicone. This is a cost effective, strong, lightweight and reliable material with high energy absorption capability.

According to some aspects, the electrically insulating fiber composite material comprises an organic fiber reinforced polymer material. The organic fiber are for example aramid or polyethylene fibers. This is a strong, lightweight and reliable material with even higher energy absorption capability.

According to some aspects, the polymer material is weather resistant and hydrophobic.

According to some aspects, the at least one electrically insulating tube (4, 41, 42) is covered by an electrically insulating hydrophobic coating. According to some aspects, the electrically insulating hydrophobic coating is silicone rubber. To protect the insulating material from weather ageing, mainly due to UV radiation, and improve the dielectric withstand in pollution and/or rain, the structural insulating material is covered by a hydrophobic coating such as silicone rubber.

According to some aspects, the at least one electrically insulating tube (4, 41, 42) has protrusions on any of, or both of, its outer and inner surfaces. The protrusions are to increase the creepage distance and to promote water run-off.

According to some aspects, the protrusions comprises silicone rubber. Silicon rubber is here used for the same reasons as above.

According to some aspects, the diameter of the at least one electrically insulating tube varies over the length of the tube. In other words, the at least one electrically insulating tube may for example be tapered and/or have a varying diameter over its length.

According to an embodiment of the disclosure, it comprises a high voltage apparatus (2) comprising a ceramic insulator (3) and a shatter protection (1) according to above, wherein there is a minimum distance between the electrically insulating tube (4, 41, 42) and the ceramic insulator (3) when the shatter protection (1) and the ceramic insulator (3) are arranged concentrically.

According to an embodiment of the disclosure, it comprises a method for producing a shatter protection for a high voltage apparatus with a ceramic insulator. The shatter protection comprises at least one electrically insulating tube comprising an electrically insulating fiber composite material. The method comprises winding a first helix shape of the electrically insulating fiber composite material at a first pitch such that there is a first gap between the winding turns, the diameter of the first helix shape is such that there is a minimum distance between the first helix shape and the ceramic insulator when the first electrically insulating tube and the ceramic insulator are arranged concentrically, and winding a second helix shape of the electrically insulating fiber composite material onto the first helix shape, the winding of the second helix shape is in the opposite direction as the winding of the first helix shape and it is wound at a second pitch, which is different from the first pitch, and such that there is a second gap between the winding turns. Thereby, a first electrically insulating tube of the at least one electrically insulating tube is formed with holes formed by the first and second gap between the winding turns. As also explained above, the holes are thus shaped as rhomboids. The rhomboid shapes of the holes will give a long creepage distance since they make sure that leakage currents cannot flow straight over the electrically insulating tube. This way to manufacture the shatter protection requires few steps and gives a resulting electrically insulating tube with holes which gives a long creepage distance over the envelope surface and which is lightweight and strong.

According to some aspects, the shatter protection comprises at least two electrically insulating tubes and the method comprises winding a third helix shape of the electrically insulating fiber composite material at a third pitch such that there is a third gap between the winding turns, the diameter of the third helix is such that there is a distance between the first electrically insulating tube and the third helix shape when the third helix shape and the first electrically insulating tube are arranged concentrically, and winding a fourth helix shape of the electrically insulating fiber composite material onto the third helix shape, the winding of the fourth helix shape is in the opposite direction as the winding of the third helix shape and it is wound at a fourth pitch, which is different from the third pitch, and such that there is a fourth gap between the winding turns. Thereby a second electrically insulating tube of the at least one electrically insulating tubes is formed with holes formed by the third and fourth gap between the winding turns. The method also comprises arranging the first electrically insulating tube and the second electrically insulating tube concentrically. The second electrically insulating tube has the same advantages as the first electrically insulating tube. The advantage with having two electrically insulating tubes arranged concentrically at a distance from each other has been previously discussed.

According to some aspects, arranging the first electrically insulating tube and the second electrically insulating tube concentrically comprises arranging them such that the holes of the electrically insulating tubes are arranged such that the shatter protection is closed seen from a centerline of the concentrically arranged electrically insulating tubes and radially outwards. In this way, there is no straight way out of the shatter protection for the ceramic parts in case of an explosion and, thus the risk of pieces flying out of the shatter protection is minimized.

According to some aspects, the first pitch, the second pitch, the third pitch and the fourth pitch are chosen such that the holes of the first electrically insulating tube and the holes of the second electrically insulating tube are arranged such the shatter protection is closed seen from a centerline of the concentrically arranged electrically insulating tubes and radially outwards.

According to some aspects, the first pitch and the third pitch are the same and wherein the second pitch and the fourth pitch are the same and wherein the step of arranging the first electrically insulating tube and the second electrically insulating tube concentrically comprises rotationally offsetting the first and the second electrically insulating tubes around the centerline of the electrically insulating tubes with respect to each other such that the holes do not overlap and the shatter protection is closed seen from a centerline of the concentrically arranged electrically insulating tubes and radially outwards. Hence, the first and second electrically insulating tubes can be manufactured in the same way, with the same winding settings, but with different diameters such that there is a distance between the two tubes when they are arranged concentrically.

BRIEF DESCRIPTION OF THE DRAWINGS

Embodiments will now be explained more closely by the description of different embodiments of the disclosure and with reference to the appended figures.

FIG. 4a-4b shows cross sections of parts of FIG. 3c. In a, the top part is shown and in b, one side of the bottom part is shown.

FIG. 6a-6b shows a block diagram of the method according to some aspects of the disclosure.

DETAILED DESCRIPTION

Figure 1:
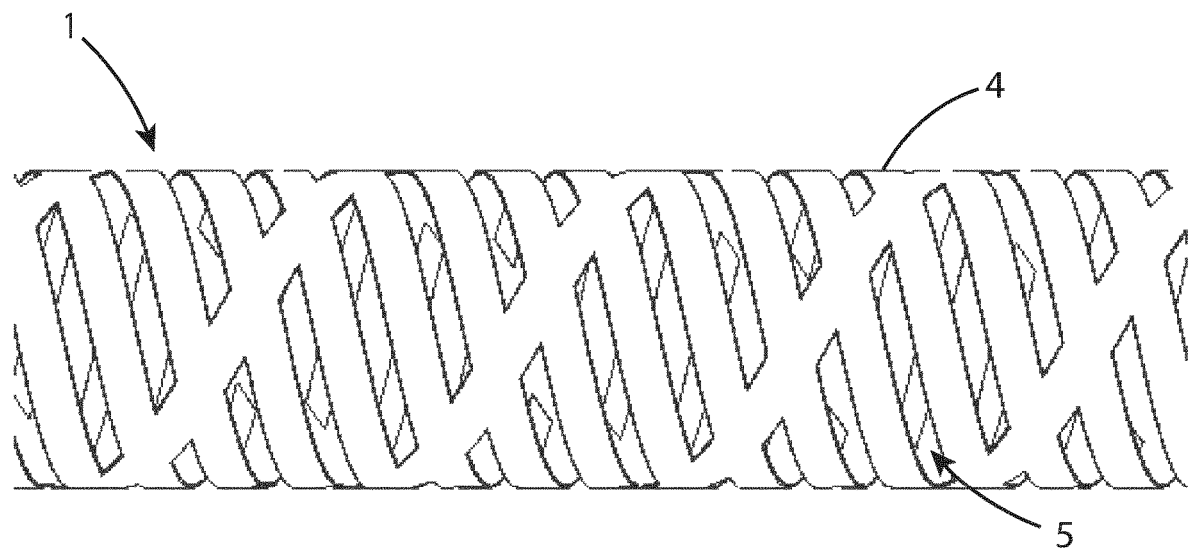
FIG. 1 shows an example of a shatter protection comprising one electrically insulating tube.

Aspects of the present disclosure will be described more fully hereinafter with reference to the accompanying drawings. The device and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Unless otherwise defined, all terms used herein have the same meaning as commonly understood by one of ordinary skill in the art to which this disclosure belongs.

The term "windings" is used as the bands of composite material helically wound to form the shatter protection as explained below in connection to the method of producing the shatter protection.

The term "pitch" is the height of one complete helix turn, measured parallel to the axis of a helix. In this document, where the helix shape is made of wide bands of composite material, the pitch is measured from centerline to centerline of the bands. That is, from the middle of the width of a band to the middle of the width of the next band.

FIG. 1 shows an example of a shatter protection 1 for a high voltage apparatus with a ceramic insulator according to the disclosure. In the example, the shatter protection comprises one electrically insulating tube 4 with holes 5.

The disclosure provides a slip-on shatter protection that limit the consequences of an apparatus failure by arresting ceramic fragments. The suggested solution has at least one electrically insulating tube with a tailored hole pattern in the tube wall that ensure shatter arrest and at the same time adequate creepage distance, air ventilation and weather protection. Station personnel can be granted access to the station area also when the equipment is energized and thereby power outages are limited. Replacement to new safer equipment become less urgent and can be better planned.

Figures 2A, 2B, 2C:
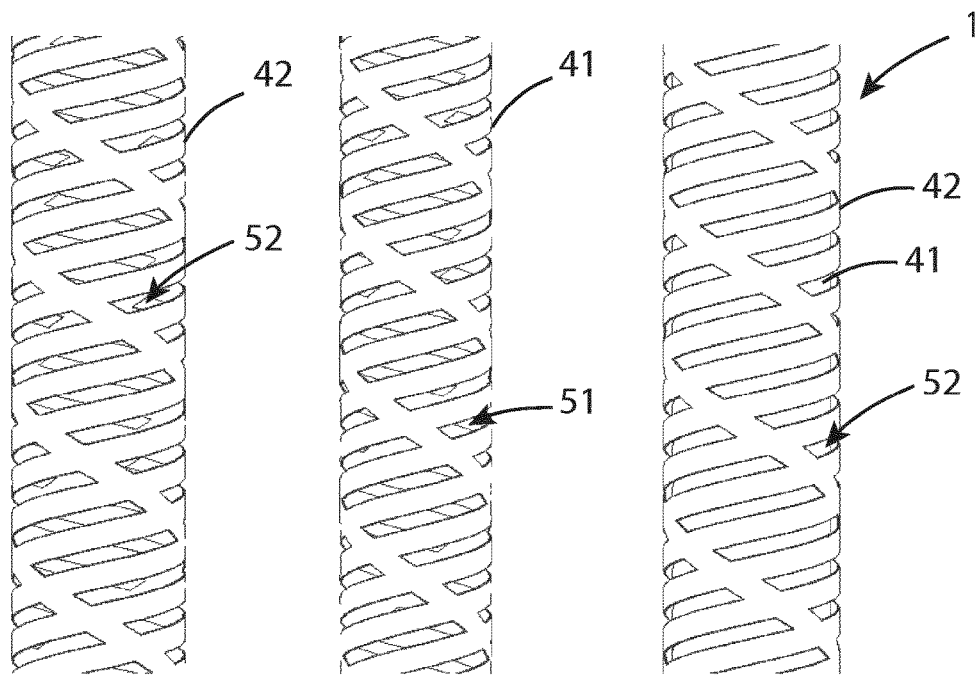
FIG. 2a-2c shows two examples of electrically insulating tubes of different diameters in a and b which are then put together concentrically to form the shatter protection in c.

FIG. 2c shows an example of a shatter protection which has two electrically insulating tubes 41, 42. In 2a and 2b, two electrically insulating tubes 41, 42 of different diameters with holes 51, 52 are shown and in 2c the two tubes have been arranged concentrically and such the holes 51 of the inner tube are covered by the electrically insulating tube of the wider tube 42.

Figure 3A:
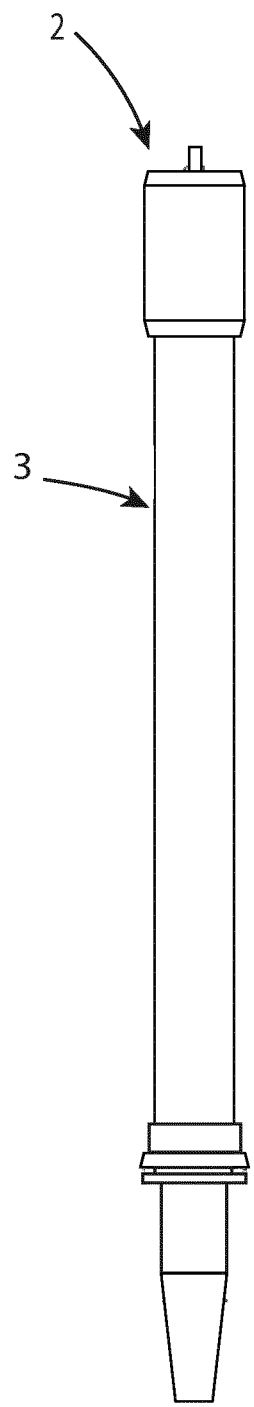
FIG. 3a-3c shows an example high voltage apparatus with a ceramic insulator in a and an example shatter protection with at least two concentrically aligned electrically insulating tubes in b. The figure also shows, in c, the high voltage apparatus with the shatter protection arranged to surround it.
Figure 3B:
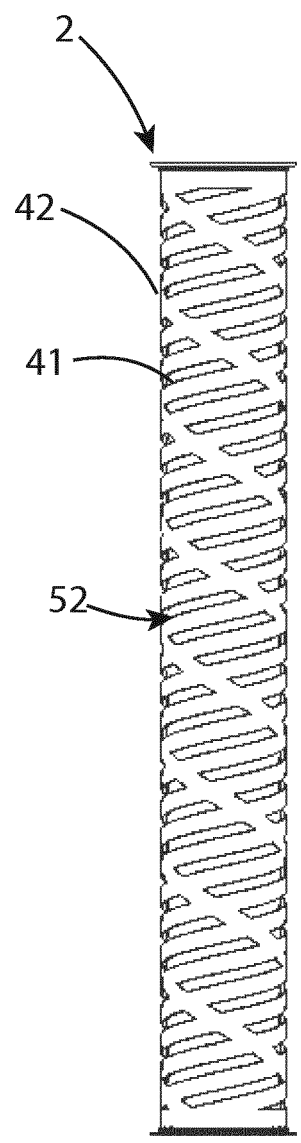
Figure 3C:
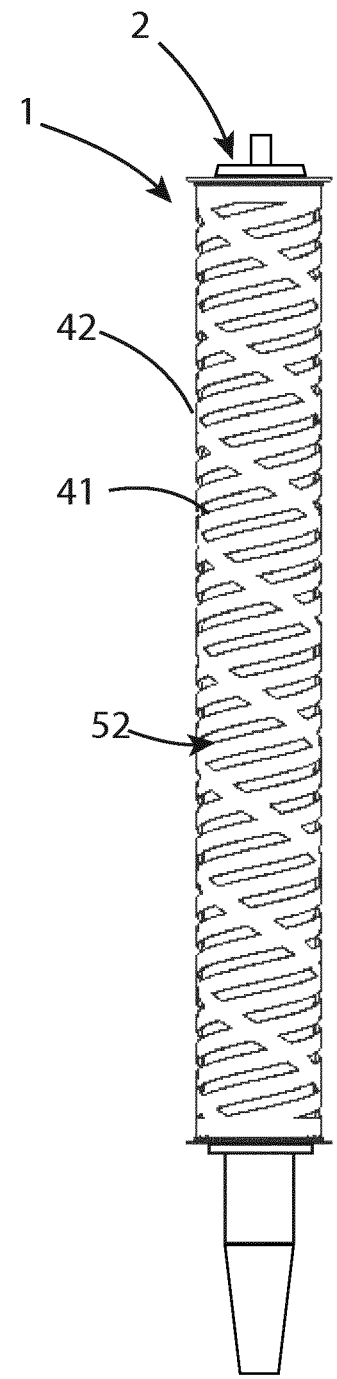

In FIG. 3c, an example shatter protection shown in 3b is arranged over a ceramic insulator 3 shown in 3a. FIG. 4a shows a cross section of the top part of the setup of FIG. 3c and FIG. 4b shows a cross section of the bottom left part of the same.

The shatter protection 1 comprises at least one electrically insulating tube 4, 41, 42. The electrically insulating tube comprising a plurality of holes 5, 51, 52 going through an envelope surface of the electrically insulating tube 4, 41, 42. The electrically insulating tube 4, 41, 42 has a diameter such that there is a minimum distance between the electrically insulating tube 4, 41, 42 and the ceramic insulator 3 when the shatter protection 1 and the ceramic insulator 3 are arranged concentrically. An electrically insulating tube with a specific diameter with holes going through the envelop surface is easily manufactured. The holes through the envelope surface will release the pressure from an explosion in the high voltage apparatus and the electrically insulating tube will catch fragments flying from the ceramic insulator. The axial dimension of the holes is preferably in the range 30 to 150 mm to provide a good balance between electrical insulation performance and shatter arrest capability. According to some aspects, the at least one electrically insulating tube 4, 41, 42 comprises an electrically insulating fiber composite material. Fiber composite materials have a high energy absorption capability, are lightweight and easy to handle during manufacturing.

The holes are through holes, going through the tube wall. The hole may be cut or punched or may be a result of the manufacturing method.

The diameter is chosen such that when the shatter protection is arranged over a ceramic insulator, there is minimum distance between the inner electrically insulating tube and the ceramic insulator. In other words, the distance between the ceramic insulator and the electrically insulating tube may vary depending on the shape of the ceramic insulator and the diameter of the electrically insulating tube but the distance between the two is at least the minimum distance. The minimum distance is, according to some aspects, 1 cm.

The disclosure provides a slip-on shatter protection insulator that limit the consequences of an apparatus failure by arresting porcelain fragments. The suggested solution has at least one concentric tube of different diameters with a tailored hole pattern in the tube walls that ensure shatter arrest and at the same time adequate creepage distance, air ventilation and weather protection. Station personnel can be granted access to the station area also when the equipment is energized and thereby power outages are limited. Replacement to new safer equipment become less urgent and can be better planned.

As show in FIGS. 2c, 3c and 4a-b, the shatter protection comprises, according to some aspects, at least two electrically insulating tubes 41, 42 with different diameters and which are arranged concentrically with a distance 6 between them. Two tubes with a distance between them will increase the safety of the shatter protection. If any pieces of the ceramic insulator pass the first electrically insulating tube, the second can catch them. There is also a free path for gas or liquid to flow through the two tubes to release pressure. The at least two electrically insulating tubes are for example held in place in the ends by a fastening arrangement. The type of fastening arrangement is up to the system designer. The fastening arrangement comprises for example to use angle irons to screw the individual tubes to a surface or a ring with the grooves for inserting the tubes as shown in FIG. 4b. In the figure there is one groove per electrically insulating tube so that they are held in place over the ceramic insulator. The distance 6 can be any distance as long as it is a distance that allows for flow of gas between the tubes. Of course, for practical reasons, the distance cannot be so large, say 10 meters, that the shatter protection cannot practically be handled or installed. One example of a distance 6 is 5 cm. Another example is 20 cm.

When there are at least two electrically insulating tubes 41, 42, the holes 5 of the at least two electrically insulating tubes 41, 42 are, according to some aspects, arranged such the shatter protection 1 is closed seen from a centerline of the concentrically arranged electrically insulating tubes and radially outwards. In other words, the holes are mismatched between the at least two electrically insulating tubes. Thus, the holes are not aligned between the at least two tubes such that the holes are non-corresponding and not overlapping seen from the outside of the outmost placed electrically insulating tube. This is seen in FIGS. 2c, 3b-c and 4a-b where two electrically insulating tubes are arranged over each other and where the holes of the inner tube are not visible because they are arranged behind the tube of the outer tube. In FIGS. 4a and 4b this feature is especially visible where there is always a part of the electrically insulating tube of the outer tube 42 covering the holes 51 of the inner tube 41. In a corresponding manner, at the location of the holes 52 of the outer tube 42 there is always a part of the inner tube 41 such that the combined envelope surface of the two electrically insulating tubes does not have holes seen from a line of sight perpendicular to the centerline of the tubes.

Figure 5:
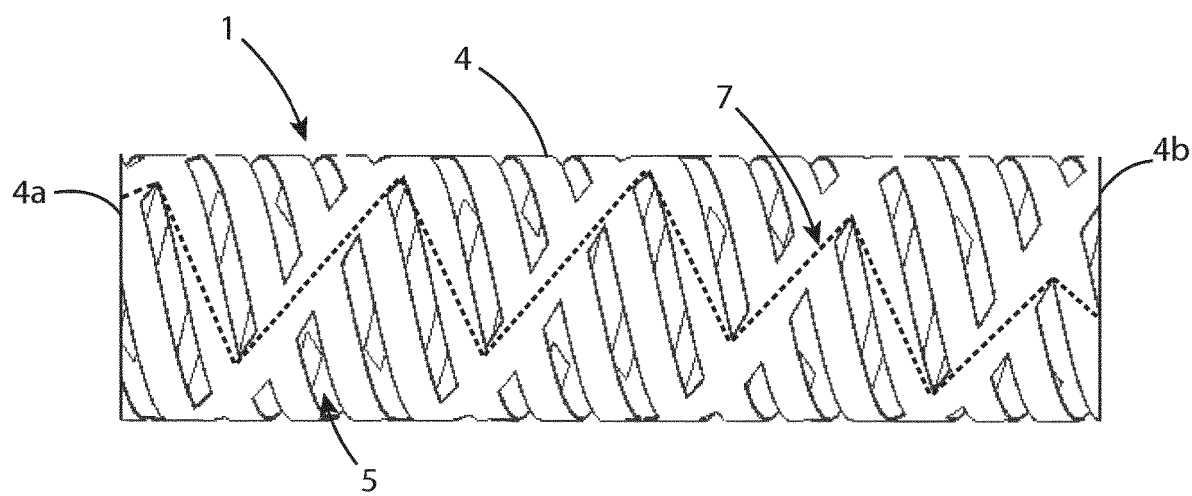
FIG. 5 shows an electrically insulating tube where the creepage distance is illustrated.

FIG. 5 shows an electrically insulating tube 4 where the creepage distance 7 is illustrated. According to some aspects, the holes 5 through the envelope surface are arranged and shaped to increase the creepage distance 7 between the ends 4a, 4b of the electrically insulating tube 4, 41, 42. In the area of high voltage equipment and insulators, there is a high focus on the creepage distance. A short distance on an insulating material can lead to high leakage currents and electric discharges resulting in flashover or premature aging. Leakage currents refers to the flow of current over the surface of the insulation. Leakage current and electrical discharges cause heating which results in damage to the insulation. High leakage currents can lead to a flash over. Leakage currents and discharges are caused by many factors. One principal reason is pollution. Pollution forms a layer over the insulating material. This, when combined with moisture in the atmosphere, provides a conductive layer for the current to flow. The risk of high leakage currents and electrical discharges can be decreased by increasing the creepage distance. To arrange the location and shape of the holes to increase the creepage distance between the ends of the electrically insulating tube means that the shortest distance on the envelope surface between the ends is increased by holes. As seen in FIG. 5, these example rhomboid shaped holes give an increased creepage distance. Thus, the creepage distance can be extended by use of an un-balanced winding pattern, e.g. +70 and −50 degrees with reference to the tube axis.

Rhomboids, i.e. a parallelogram in which adjacent sides are of unequal lengths and angles are non-right angled, shaped holes can be achieved for example through the process of manufacturing the electrically insulating tubes. According to some aspects, the at least one electrically insulating tube 4, 41, 42 comprises a first electrically insulating tube (41) comprising two layers of helically wound electrically insulating fiber composite material, wherein one of the layers comprises a first helix shape of the electrically insulating fiber composite material wound at a first pitch such that there is a first gap between the winding turns, and the other layer comprises a second helix shape of the electrically insulating fiber composite material wound onto the first helix shape, the winding of the second helix shape is in the opposite direction as the winding of the first helix shape and it is wound at a second pitch, which is different from the first pitch, and such that there is a second gap between the winding turns. The rhomboids will also be shifted in relation to each other along the envelope surface. The rhomboid shapes of the holes will give a long creepage distance since they make sure that the leakage currents cannot occur straight over the electrically insulating tube. Helically wound electrically insulating fiber composite material gives a strong and lightweight electrically insulating tube which is non-brittle. The width of the windings is denoted band width. Possible band widths depend on what machine is to be used to wound the electrically insulating fiber composite material. According to some aspects, the band width is between 10 to 400 mm and typically between 40 and 200 mm.

Looking for example at FIG. 1, it can be seen that the illustrated electrically insulating tube 4 comprises two different windings; one with a low pitch giving many winding turns and one in the opposite direction which has a larger pitch giving fewer turns.

The pitches are chosen so that there is a gap between the windings. The pitch needed for a specific gap width thus depends on the width of the wounded composite material and how large a gap one wants. When the first and the second pitches are the same and the width of the wounded composite material are the same for both windings, the resulting holes will have the shape of a rhombus. Such a hole pattern may be used but it does not increase the creepage distance to the same extent as holes of rhomboid shape; but it may be preferable for manufacturing efficiency reasons. Thus, according to some aspects, the first and second pitches are the same. According to some aspects, the pitch is between 80 to 2500 mm.

In the example when there are more than one electrically insulating tube, the different tubes may be manufactured in the same way as the first electrically insulating tube or in a different way. According to some aspects, the at least one electrically insulating tube 4, 41, 42 comprises a second electrically insulating tube 42 with a different diameter than the first electrically insulating tube 41. The first and the second electrically insulating tubes 41, 42 are arranged concentrically with a distance 6 between them. The second electrically insulating tube 42 comprises two layers of helically wound electrically insulating fiber composite material, wherein one of the layers comprises a third helix shape of the electrically insulating fiber composite material wound at a third pitch such that there is a third gap between the winding turns, and the other layer comprises a fourth helix shape of the electrically insulating fiber composite material wound onto the third helix shape, the winding of the fourth helix shape is in the opposite direction as the winding of the third helix shape and it is wound at a fourth pitch, which is different from the third pitch, and such that there is a fourth gap between the winding turns. The second electrically insulating tube has the same advantages as the first arranged in the same way. The third and fourth pitches may also be chosen to be the same with the same advantage and disadvantage as discussed above with the first and second pitches. According to some aspects, the third and fourth pitches are the same. The second electrically insulating tube has a diameter that is larger than the first electrically insulating tube since it should be arranged to encircle the first electrically insulating tube.

In other words, to increase the fragment arrest capability of the shatter protection, one or more tubes of different diameter and shifted hole pattern can be positioned outside the first tube. The tubes are cost effectively realized near net-shape by filament winding in a winding pattern that do not cover the whole surface of the winding tool.

The electrically insulating tubes 4, 41, 42 can also be realized by machining of holes 5, 51, 52 in the tube wall. This gives more freedom in terms of hole geometry but require more material and machine time.

It should be noted that the at least one electrically insulating tube may comprise more than two layers of helically wound electrically insulating fiber composite material. In the two aspects above, where the electrically insulating tubes comprises two layers wound with a different pitch, any additional layers will have the same pitch and band width of the windings as any of the two first layers such that the electrically insulating tube gets a larger thickness but with the same shape of the gaps and resulting holes. The additional layers are for the structural integrity of the tubes.

The material chosen for the electrically insulating tubes is electrically insulating. The material may also be chosen such that it is light weight and easy to handle. Depending on the size of the ceramic insulator, there might be different requirements on the material of the electrically insulating tubes; a small ceramic insulator may not explode with the same force as a larger one and/or the pieces of ceramic may not be as big, such that a weaker electrically insulating tube may suffice. According to some aspects, the electrically insulating fiber composite material comprises an inorganic fiber reinforced polymer material. The inorganic fiber being for example glass or basalt fibers. According to some aspects, the electrically insulating fiber composite material comprises an organic fiber reinforced polymer material. The organic fiber are for example aramid or polyethylene fibers. The composite material comprises for example a filament wound glass fiber reinforced epoxy.

Depending on where the shatter protection is to be used, it may be subjected to different kinds of stress, such as rain or dirt. The at least one electrically insulating tube 4, 41, 42 is, according to some aspect, covered by an electrically insulating hydrophobic coating. According to some aspects, the electrically insulating hydrophobic coating is silicone rubber. To protect the insulating material from weather ageing, mainly due to UV radiation, and improve the dielectric withstand in pollution and/or rain, the structural insulating material can be covered by a hydrophobic coating such as silicone rubber. The hydrophobic coating can be applied to the at least one electrically insulating tube by dipping, brushing or spraying. The same function can also be achieved by use of a weather resistant hydrophobic polymer in the winding process.

To increase the creepage distance of the shatter protection 1, protrusions might be formed on the outer or inner surface of the electrically insulating tube. Thus, according to some aspects, the at least one electrically insulating tube 4, 41, 42 has protrusions on any of, or both of, its outer and inner surfaces. The protrusions may be any shape or size that still allows for the holes to be present and which increases the surface creepage distance of the shatter protection. The protrusions are, for example, an uneven surface of the silicon rubber mentioned below. The protrusion may also be in the form of sheds. According to some aspects, the protrusions comprises silicone rubber. Silicon rubber is here used for the same reasons as above.

Depending on the shape of the ceramic insulator, the at least one electrically insulating tube may have a varying diameter. According to some aspects, the diameter of the at least one electrically insulating tube varies over the length of the tube. In other words, the at least one electrically insulating tube may for example be tapered and/or have a varying diameter over its length. According to some aspects, the diameter is such that when the shatter protection 1 is to be arranged over the ceramic insulator, it can be pulled over the ceramic insulator without interfering with the ceramic insulator.

According to an embodiment of the disclosure, it comprises a high voltage apparatus 2 comprising a ceramic insulator 3 and a shatter protection 1 according to above, wherein there is a minimum distance between the electrically insulating tube 4, 41, 42 and the ceramic insulator 3 when the shatter protection 1 and the ceramic insulator 3 are arranged concentrically. The shatter protection has the same features and aspects as described above and with the same advantages.

Figure 6A:
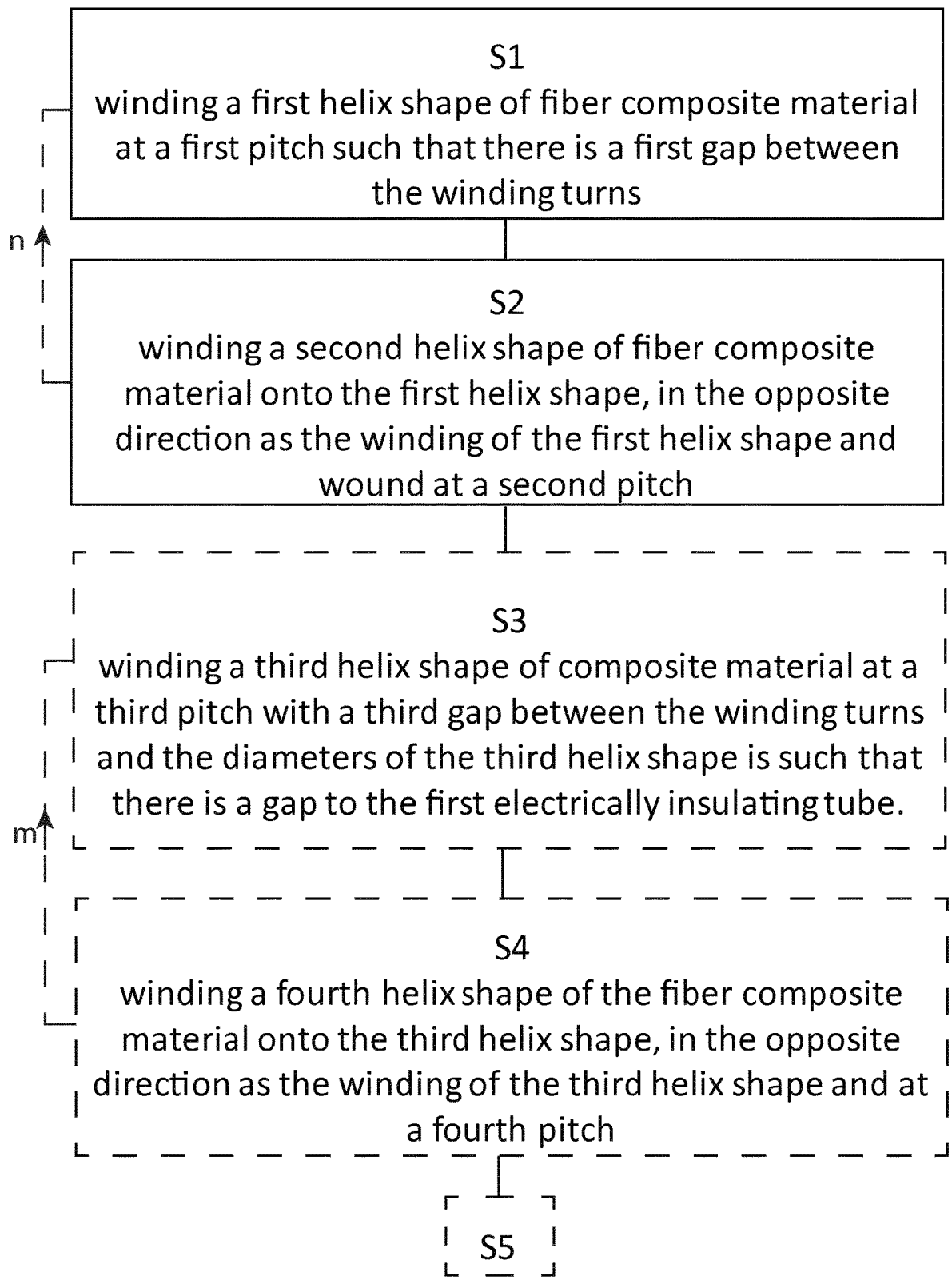

The disclosure also provides a method for producing a shatter protection 1 for a high voltage apparatus 2 with a ceramic insulator 3. FIGS. 6a and 6b shows a block diagram of the method where steps S1 to S4 are shown in 6a and S5 is shown in 6b. The boxes with a solid line represent the steps of broadest example implementation of the disclosure and the boxes with dashed lines are example aspects of the disclosure. The method comprises a way to manufacture a shatter protection 1 comprising at least one electrically insulating tube 4, 41, 42 comprising an electrically insulating fiber composite material.

The method comprises winding S1 a first helix shape of the electrically insulating fiber composite material at a first pitch such that there is a first gap between the winding turns. In other words, the pitch of the helix shape is larger than the band width of the wound material. The diameter of the first helix shape is such that there is a minimum distance between the first helix shape and the ceramic insulator 3 when the first electrically insulating tube 4, 41 and the ceramic insulator 3 are arranged concentrically. The minimum distance is such that it allows for gas to flow in the gap between the first helix shape and the ceramic insulator. According to some aspects, the minimum distance is 1 cm. The distance can be smaller or larger as long as it allows for flow of gas or liquid and the shatter protection can be handled by personnel.

The method comprises winding S2 a second helix shape of the electrically insulating fiber composite material onto the first helix shape, the winding of the second helix shape is in the opposite direction as the winding of the first helix shape and it is wound at a second pitch, which is different from the first pitch, and such that there is a second gap between the winding turns. In other words, the first and second helix shape are wound in opposite directions and the first and the second gaps have different widths since the first and the second pitches are different. Thereby, a first electrically insulating tube 41 of the at least one electrically insulating tube 4 is formed with holes 51 formed by the first and second gap between the winding turns. As also explained above, the holes are thus shaped as rhomboids, i.e. a parallelogram in which adjacent sides are of unequal lengths and angles are non-right angled. The rhomboids will also be shifted in relation to each other along the envelope surface. The rhomboid shapes of the holes will give a long creepage distance since they make sure that the leakage currents cannot flow straight over the electrically insulating tube. Helically wound electrically insulating fiber composite material gives a strong and lightweight electrically insulating tube which is non-brittle. This way to manufacture the shatter protection requires few steps and gives a resulting electrically insulating tube with holes which gives a long creepage distance over the envelop surface and which is lightweight and strong.

To get a gap between windings, i.e. to get a gap between the turns of the wound material, the pitch of the resulting helix is larger than the band width of the wound material. The height of the pitch and the band width has been previously discussed.

In the aspect that more than one electrically insulating tube is used in the shatter protection, the method comprises steps for producing a second electrically insulating tube. According to some aspects, the shatter protection 1 comprises at least two electrically insulating tubes and the method comprises winding S3 a third helix shape of the electrically insulating fiber composite material at a third pitch such that there is a third gap between the winding turns, the diameter of the third helix shape is such that there is a distance 6 between the first electrically insulating tube 41 and the third helix shape when the third helix shape and the first electrically insulating tube 41 are arranged concentrically, and winding S4 a fourth helix shape of the electrically insulating fiber composite material onto the third helix shape, the winding of the fourth helix shape is in the opposite direction as the winding of the third helix shape and it is wound at a fourth pitch, which is different from the third pitch, and such that there is a fourth gap between the winding turns. In other words, the third and fourth helix shape are wound in opposite directions and the third and the fourth gaps have different widths since the third and the fourth pitches are different. Thereby a second electrically insulating tube 42 of the at least one electrically insulating tubes 4 is formed with holes 52 formed by the third and fourth gap between the winding turns. The method also comprises arranging S5 the first electrically insulating tube 41 and the second electrically insulating tube 42 concentrically. The second electrically insulating tube has the same advantages and basic features as the first electrically insulating tube. The advantage with having two electrically insulating tubes arranged concentrically at a distance from each other has been previously discussed.

It has been previously discussed that the at least one electrically insulating tube may comprise more than two layers of helically wound electrically insulating fiber composite material. In the two aspects above, where one electrically insulating tube is produced in step S1 and S2 and the other with step S3 and S4, more layers may be added by simply repeating step S1 and S2 n number of times for the first tube and S3 and S4 m number of times for the second tube. The number of times the steps are repeated, i.e. the value of n and m, is up to the designer of the shatter protection. Different sizes of the tubes may require different number of layers needed for structural stability and different ceramic insulators may require different strengths of the shatter protection. Also, different equipment for producing the electrically insulating tubes may be able to handle different thicknesses of the wound material.

According to some aspects the winding S1, S2, S3 and S4 of the electrically insulating fiber composite material comprises feeding the composite material onto a cylindrical shape, the cylindrical shape matching the intended inner shape of the electrically insulating tube, wherein the cylindrical shape rotates and simultaneously moving the source of the material feed parallelly with the center axis of the cylindrical shape. According to some aspects, steps S1 and S3 are done in one direction of the feed and S2 and S4 are fed in the opposite direction.

To further minimize the risk of ceramic fragments from damaging personnel or equipment, the at least two electrically insulating tubes may be arranged such that there is no straight path out of the shatter protection from the center axis of the electrically insulating tubes and radially outwards. Thus, according to some aspects, arranging S5 the first electrically insulating tube 41 and the second electrically insulating tube 42 concentrically comprises arranging S5a them such that the holes 51, 52 of the electrically insulating tubes 41, 42 are arranged such that the shatter protection 1 is closed seen from a centerline of the concentrically arranged electrically insulating tubes 41, 42 and radially outwards. In this way, there is no straight way out of the shatter protection for the ceramic parts in case of an explosion and, thus the risk of pieces flying out of the shatter protection is further reduced.

According to some aspects, the first pitch, the second pitch, the third pitch and the fourth pitch are chosen such that the holes 51 of the first electrically insulating tube 41 and the holes 52 of the second electrically insulating tube 42 are arranged such the shatter protection 1 is closed seen from a centerline of the concentrically arranged electrically insulating tubes 41, 42 and radially outwards. If the holes are narrower than the width of the band of composite material in the windings there is leeway for how the tubes can be arranged so that all holes are closed by composite material.

The first and the second electrically insulating tubes 41, 42 are, according to some aspects, produced using the same steps but with different band widths of the winding. According to some aspects, the first pitch and the third pitch are the same and wherein the second pitch and the fourth pitch are the same and wherein the step of arranging S5 the first electrically insulating tube 41 and the second electrically insulating tube 42 concentrically comprises rotationally offsetting S5b the first and the second electrically insulating tubes around the centerline of the electrically insulating tubes 41, 42 with respect to each other such that the holes 51, 52 do not overlap and the shatter protection 1 is closed seen from a centerline of the concentrically arranged electrically insulating tubes 41, 42 and radially outwards. In other words, the first and second electrically insulating tubes are rotated with respect to each other such that the windings of the outer tube cover the holes of the inner tube and vice versa. Hence, the first and second electrically insulating tubes can be manufactured in the same way, with the same winding settings, but with different diameters such that there is a distance 6 between the two tubes when they are arranged concentrically.

An example of a shatter protection 1 will now be described with reference to drawings 2-4. In the example, two electrically insulating tubes 41 and 42 are used. They are produced with corresponding pitches and width of the windings. In other words, the first and third pitches are the same and the second and fourth pitches are the same. The diameter of the two electrically insulating tubes are not the same such that they can be arranged concentrically with a distance between them. The distance between them is for example 5 cm. The innermost electrically insulating tube has a diameter such that it can encircle a ceramic insulator with a minimum distance between them. The diameter will thus depend on the diameter of the ceramic insulator which typically is in the range 200 mm to 1000 mm. As previously discussed, there is a minimum distance between the ceramic insulator and the innermost electrically insulating tube such that there is a gap therebetween.

The two electrically insulating tubes thus have corresponding hole patterns and when they are arranged concentrically, they are axially displaced with respect to each other so that the insulating material of the outer tube covers the holes of the inner tube and vice versa. This can for example be seen in FIG. 2c. The two electrically insulating tubes are also cut at the ends so that the lengths of the tubes are such that they can be arranged over a ceramic insulator. In the example, the two electrically insulating tubes are fastened by two fastening arrangements at the ends of the tubes as can be seen in FIGS. 4a and 4b. In this example, the fastening arrangements are rings with two grooves for the tubes.

The invention claimed is:

1. A shatter protection for a high voltage apparatus with a ceramic insulator, the shatter protection comprising at least one electrically insulating tube, the electrically insulating tube comprising an envelope surface having at least one helix shape of an electrically insulating material and a plurality of holes going through the envelope surface of the electrically insulating tube, the electrically insulating tube having a diameter such that there is a minimum distance between the electrically insulating tube and the ceramic insulator when the shatter protection and the ceramic insulator are arranged concentrically.

2. The shatter protection according to claim 1, comprising at least two electrically insulating tubes with different diameters and which are arranged concentrically with a distance between them.

3. The shatter protection according to claim 2, wherein the holes of the at least two electrically insulating tubes are arranged such the shatter protection is closed as seen from a centerline of the concentrically arranged electrically insulating tubes and radially outwards.

4. The shatter protection according to claim 1, wherein the holes through the envelope surface are arranged and shaped to increase a creepage distance between the ends of the electrically insulating tube.

5. The shatter protection according to claim 1, wherein the at least one electrically insulating tube comprises an electrically insulating fiber composite material.

6. The shatter protection according to claim 5, wherein the at least one electrically insulating tube comprises a first electrically insulating tube comprising two layers of helically wound electrically insulating fiber composite material,
wherein one of the layers comprises the at least one helix shape comprising a first helix shape of the electrically insulating fiber composite material wound with a first pitch such that there is a first gap between the winding turns, and the other layer comprises a second helix shape of the electrically insulating fiber composite material wound onto the first helix shape, and
wherein the winding of the second helix shape is in the opposite direction as the winding of the first helix shape and it is wound at a second pitch, which is different from the first pitch, offset from the plane perpendicular to an electrically insulating tube centerline and such that there is a second gap between the winding turns.

7. The shatter protection according to claim 6, wherein the at least one electrically insulating tube comprises a second electrically insulating tube with a different diameter than the first electrically insulating tube,
wherein the first and the second electrically insulating tubes are arranged concentrically with a distance between them,
wherein the second electrically insulating tube comprises two layers of helically wound electrically insulating fiber composite material,
wherein one of the layers comprises a third helix shape of the electrically insulating fiber composite material wound at a third pitch such that there is a third gap between the winding turns, and the other layer comprises a fourth helix shape of the electrically insulating fiber composite material wound onto the third helix shape, and
wherein the winding of the fourth helix shape is in the opposite direction as the winding of the third helix shape and is wound at a fourth pitch, which is different from the third pitch, such that there is a fourth gap between the winding turns.

8. The shatter protection according to claim 5, wherein the electrically insulating fiber composite material comprises an inorganic fiber reinforced polymer material.

9. The shatter protection according to claim 5, wherein the electrically insulating fiber composite material comprises an organic fiber reinforced polymer material.

10. A high voltage apparatus comprising a ceramic insulator and a shatter protection, the shatter protection comprising a first electrically insulating tube comprising a plurality of holes going through an envelope surface of the electrically insulating tube, the electrically insulating tube having a first diameter such that there is a minimum distance between the electrically insulating tube and the ceramic insulator when the shatter protection and the ceramic insulator are arranged concentrically, and
a second electrically insulating tube with a second diameter, wherein the first electrically insulating tube and the second electrically insulating tube are arranged concentrically with a distance between them.

11. A method for producing a shatter protection for a high voltage apparatus with a ceramic insulator, the shatter protection comprising at least one electrically insulating tube comprising an electrically insulating fiber composite material, the method comprising:
winding a first helix shape of the electrically insulating fiber composite material at a first pitch such that there is a first gap between the winding turns, the first helix shape having a diameter such that there is a minimum distance between the first helix shape and the ceramic insulator when a first electrically insulating tube and the ceramic insulator are arranged concentrically; and winding a second helix shape of the electrically insulating fiber composite material onto the first helix shape, the winding of the second helix shape is in the opposite direction as the winding of the first helix shape and it is wound at a second pitch, which is different from the first pitch, and such that there is a second gap between the winding turns, thereby forming a first electrically insulating tube of the at least one electrically insulating tube with holes formed by the first and second gap between the winding turns.

12. The method according to claim 11, wherein the shatter protection comprises at least two electrically insulating tubes, the method further comprising:

winding a third helix shape of the electrically insulating fiber composite material at a third pitch such that there is a third gap between the winding turns, the third helix shape having a diameter such that there is a distance between the first electrically insulating tube and the third helix shape when the third helix shape and the first electrically insulating tube are arranged concentrically;

winding a fourth helix shape of the electrically insulating fiber composite material onto the third helix shape, wherein the winding of the fourth helix shape is in the opposite direction as the winding of the third helix shape and it is wound at a fourth pitch, which is different from the third pitch, and such that there is a fourth gap between the winding turns, thereby forming a second electrically insulating tube of the at least one electrically insulating tubes with holes formed by the third and fourth gap between the winding turns; and:

arranging the first electrically insulating tube and a second electrically insulating tube concentrically.

13. The method according to claim 12, wherein arranging the first electrically insulating tube and the second electrically insulating tube concentrically comprises arranging the first electrically insulating tube and the second electrically insulating tube such that the holes of the electrically insulating tubes are arranged such that the shatter protection is closed as seen from a centerline of the concentrically arranged electrically insulating tubes and radially outwards.

14. The method according to claim 12, wherein the first pitch, the second pitch, the third pitch and the fourth pitch are chosen such that the holes of the first electrically insulating tube and the holes of the second electrically insulating tube are arranged such that the shatter protection is closed as seen from a centerline of the concentrically arranged electrically insulating tubes and radially outwards.

15. The method according to claim 12, wherein the first pitch and the third pitch are the same and wherein the second pitch and the fourth pitch are the same, and wherein arranging the first electrically insulating tube and the second electrically insulating tube concentrically comprises rotationally offsetting the first and the second electrically insulating tubes around a centerline of the electrically insulating tubes with respect to each other such that the holes do not overlap and the shatter protection is closed as seen from the centerline of the concentrically arranged electrically insulating tubes and radially outwards.

* * * * *